United States Patent [19]

Dietrich

[11] Patent Number: 4,582,755

[45] Date of Patent: Apr. 15, 1986

[54] CONSTRUCTION BOARDS BONDED BY ORGANIC AND/OR INORGANIC CEMENTING MEANS

[75] Inventor: Johannes Dietrich, Verl, Fed. Rep. of Germany

[73] Assignee: Fulgurit GmbH & Co. Kommanditgesellschaft, Wunstorf, Fed. Rep. of Germany

[21] Appl. No.: 525,480

[22] Filed: Aug. 22, 1983

[30] Foreign Application Priority Data

Aug. 25, 1982 [DE] Fed. Rep. of Germany ....... 3231500

[51] Int. Cl.$^4$ .................. B32B 5/16; B32B 23/00; B32B 19/00
[52] U.S. Cl. .................................. 428/324; 428/326; 428/537.1; 428/920; 428/921; 106/15.05; 524/413
[58] Field of Search ............... 428/326, 537, 689, 702, 428/324, 920, 921; 524/413; 106/15.05

[56] References Cited

U.S. PATENT DOCUMENTS

| | | | |
|---|---|---|---|
| 1,136,370 | 4/1915 | Scharwath | 428/920 X |
| 2,876,153 | 3/1959 | Dorland et al. | 428/326 |
| 2,883,352 | 4/1959 | Sorge | 524/413 X |
| 3,594,339 | 7/1971 | Palaika | 524/413 X |
| 3,630,822 | 9/1970 | Carmellini | 428/326 X |

*Primary Examiner*—George F. Lesmes
*Assistant Examiner*—Nancy A. B. Swisher
*Attorney, Agent, or Firm*—Wells & Wells

[57] ABSTRACT

A construction board provided with reinforcements such as fibers and bonded together by organic and/or inorganic cementing means such as cement or plastics is made non-combustible by inclusion of additives and without significant degradation of strength to an extent that the combustion class A 2 of DIN (German Industrial Standard) 4102 is observed. Also, and at the same time, the toxicity of the combustion gases is reduced.

The invention provides that the construction board includes from 20 to 70% of manganese dioxide ($MnO_2$).

21 Claims, No Drawings

CONSTRUCTION BOARDS BONDED BY ORGANIC AND/OR INORGANIC CEMENTING MEANS

BACKGROUND OF THE INVENTION

The invention concerns components provided with reinforcing means such as fibers, preferably construction boards, in particular wood-cement boards, which are bonded together by organic and/or inorganic cementing means such as cement or plastics.

Components and construction boards of this kind incur the drawback that it is difficult to achieve with them a non-combustibility per German Industrial Standard DIN 4102, in particular that of Combustion Class A2 of this regulation.

It is already known in this respect to provide additives of borates, phosphates, carbonates, chlorides etc. in wood-cement boards. When additives of this kind are used, either the non-combustibility is achieved at the cost of an often substantial decrease in strength of the construction boards, or the required reduction in toxicity of the combustion smoke is not achieved.

SUMMARY OF THE INVENTION

It is therefore the object of the invention to create components or construction boards of the initially cited kind of which the strength shall not be degraded, or not substantially, in spite of additives being present, and wherein furthermore the toxicity of the combustion gases is reduced while the prescribed non-combustibility is observed.

This problem is solved by the invention in that the components or construction boards include a proportion of 20 to 70% of manganese dioxide ($MnO_2$).

By means of this manganese dioxide ingredient, a component or construction board is created which surprisingly achieves very easily the non-combustibility of the above DIN (German Industrial Standard) regulation, combustion class A2, without thereby significantly degrading the strength. Furthermore the toxicity of the combustion gases in the component of the invention is substantially reduced compared to that of a component without that ingredient, namely to about 1/10.

DESCRIPTION OF THE PREFERRED EMBODIMENTS

When using the composition of the invention for a wood-cement board, the following ranges in proportions are applicable:

EXAMPLE 1

Wood fibers: about 8 to 20%
cement: about 10 to 70%
manganese dioxide: about 20 to 70%.

The following mixture ratio was found especially advantageous:

EXAMPLE 2 wood fibers: about 12%
cement: about 48%
manganese dioxide: about 40%.

The following examples clarify the further applicability of the composition of the invention.

EXAMPLE 3

A wood-chip board bonded together by synethetic resin
wood chips: about 60%
urea resin + hardener: about 10%
manganese dioxide: about 30%.

EXAMPLE 4

Chip-board bonded together by water-glass
wood chips: about 35%
sodium-silicate glass + hardener: about 35%
manganese dioxide: about 30%

EXAMPLE 5 mica-board bonded together by synthetic resin
mica, muscovite: about 65%
phenolic resin + hardener: about 5%
manganese dioxide: about 30%

EXAMPLE 6 cement-bonded cellulose board
Cellulose suspension in water: about 7%
Portland cement: about 57%
manganese dioxide: about 37%

In addition to the manganese-dioxide ingredient further additives may be provided, in particular additives to increase the strenght of the components, for instance formic acid (HCOOH). An addition of about 5% of formic acid was found advantageous.

Also additions of aluminum sulfate $[Al_2(SO_4)_3 \cdot X-H_2O]$ and water glass are useful.

I claim:

1. In construction boards, reinforced by fibers and bonded together by cementing means comprising wood cement boards having about 8 to 20% of wood fibers, and about 10 to 70% cement;
   the improvement comprising said construction boards having a proportion of about 20 to 70% of manganese dioxide ($MnO_2$) thereby reducing the combustibility and the toxicity of combustion gases thereby.

2. The construction boards of claim 1, wherein their composition is about 12% wood fibers, about 48% cement, and about 40% manganese dioxide.

3. The construction boards of claim 1, wherein formic acid is added to the cementing means.

4. The construction boards of claim 3, wherein about 5% of said formic acid is added.

5. The construction boards of claim 1, wherein aluminum sulfate and water-glass are added to the cementing means.

6. In construction boards, reinforced by fibers and bonded together by cementing means comprising wood-chip boards bonded together by synthetic-resin and in that their composition is about 60% wood-chips and about 10% urea resin + hardener;
   the improvement comprising said construction boards having a proportion of about 30% of manganese dioxide ($MnO_2$) thereby reducing the combustibility and the toxicity of combustion gases.

7. The construction boards of claim 6, wherein formic acid is added to the cementing means.

8. The construction boards of claim 7, wherein about 5% of said formic acid is added.

9. The construction boards of claim 6, wherein aluminum sulfate and water-glass are added to the cementing means.

10. In construction boards, reinforced by fibers and bonded together by cementing means comprising chipboards bonded together by water-glass and in that their composition is about 35% wood-chips, and about 35% sodium silicate plus hardener;

the improvement comprising said construction boards having a proportion of about 30% of manganese dioxide ($MnO_2$) thereby reducing the combustibility and the toxicity of combustion gases.

11. The construction boards of claim 10, wherein formic acid is added to the cementing means.

12. The construction boards of claim 11, wherein about 5% of said formic acid is added.

13. The construction boards of claim 10, wherein aluminum sulfate and water-glass are added to the cementing means.

14. In construction boards, reinforced by fibers and bonded together by cementing means comprising micaboards bonded together by synthetic resin and in that their composition is about 65% mica and about 5% phenolic resin plus hardener, the improvement comprising said construction boards having a proportion of about 30% of manganese dioxide ($MnO_2$) thereby reducing the combustibility and the toxicity of combustion gases thereby.

15. The construction boards of claim 14, wherein formic acid is added to the cementing means.

16. The construction boards of claim 15, wherein about 5% of said formic acid is added.

17. The construction boards of claim 14, wherein aluminum sulfate and water-glass are added to the cementing means.

18. In construction boards, reinforced by fibers and bonded together by cementing means comprising cement-bonded cellulose-boards and in that their composition is about 7% cellulose suspension in water and about 56% Portland cement, the improvement comprising said construction boards having a proportion of about 37% of manganese dioxide ($MnO_2$) thereby reducing the combustibility and the toxicity of combustion gases.

19. The construction boards of claim 18, wherein formic acid is added to the cementing means.

20. The construction boards of claim 19, wherein about 5% of said formic acid is added.

21. The construction boards of claim 18, wherein aluminum sulfate and water-glass are added to the cementing means.

* * * * *